Patented Jan. 8, 1946

2,392,497

UNITED STATES PATENT OFFICE 2,392,497

RESIN PRODUCTION

Joseph J. O'Neill, Chester, Pa., assignor to Sinclair Refining Company, New York, N. Y., a corporation of Maine No Drawing. Application August 31, 1944, Serial No. 552,205

7 Claims. (Cl. 196—13)

This invention relates to a process for the recovery from a petroleum refinery waste product of film forming materials valuable for use in the preparation of surface coatings of various types and for other purposes.

It has been heretofore suggested that the extract resulting from the solvent treatment of petroleum oils with anhydrous or slightly aqueous phenol to increase their concentration of paraffinic constituents, or conversely to decrease their concentration of non-paraffinic constituents, be subjected to a further extraction with an aqueous phenol solvent to recover resin values therefrom. According to the prior investigators, resin values may be recovered from both the extract and raffinate phases developing upon settling of the re-extraction mixture. However, resins recoverable in accordance with the proposed process from the raffinate phase are admittedly of very low consistency and of relatively little value.

I have now found that the said raffinate phase or layer may be made to yield by a still further extraction operation a highly useful film forming material of a nature intermediate a drying oil and a resin. Generally described, my process in its preferred embodiment is executed by subjecting an extract from the solvent treatment of a petroleum oil to increase the concentration of paraffinic components therein to a distillation or other suitable treatment whereby the extract is rendered solvent free, digesting the solvent-free extract with an aqueous phenol solvent, allowing the digested mixture to stand until the formation of two layers occurs, separating the layers, digesting the upper or raffinate layer with an aqueous phenol solvent in which the ratio of water to phenol is preferably lower than in the aqueous phenol solvent employed in the first digestion, allowing the digested mixture to stand until two layer separation occurs, and recovering the product of the process from the lower or extract layer.

The foregoing preferred embodiment of the process of the invention is applicable irrespective of the solvent used in the extraction of the petroleum oil. Solvents other than phenols which have been used in the extraction of petroleum oils to increase their concentration of paraffinic components include, for example: liquefied sulfur dioxide, nitrobenzene, dichloro-ethyl ether, mixtures of alcohols and ethers, acetone, methyl ethyl ketone, methyl acetate, methyl cellosolve, phenyl acetate, furfural, and the like. Such solvents are employed commercially in the production of lubricating oils of a quality comparable to Pennsylvania lubricating oils from mixed base crudes. The oil fractions treated may represent either residue or distillate stocks. Extracts resulting from the treatment of oils containing lubricating oil constituents are particularly preferred for treatment according to the invention.

In the application of the preferred embodiment of the present process to extracts from the selective solvent treatment of wax-containing oils, I have found it advantageous to use in the first digestion an aqueous phenol solvent containing about 90% phenol and about 10% water and in the second digestion an aqueous phenol solvent containing about 95% phenol and about 5% water. I have further found it advantageous to use a ratio of solvent to extract in the first digestion of about 1:1 and to use a ratio of solvent to raffinate in the second digestion of about 3:1.

For convenience, extracts resulting from the selective solvent treatment of a wax-containing oil, for example, a deasphalted Mid-Continent residuum, will be hereinafter referred to as "A" extracts while other extracts treatable according to the invention, for example, an extract from the selective solvent treatment of an essentially wax-free oil, as a dewaxed distillate oil, will be identified as "B" extracts. It will be understood that the hydrocarbon components in the case of either type of extract are predominantly non-paraffinic in character, being chiefly naphthenes and other compounds of the so-called asphaltic series.

Where the solvent processing giving the extract to be treated has been carried out using anhydrous phenol or, as is more usual, phenol containing a few percent of water, for example, 2 to 5% water, the step of freeing the extract of solvent may be omitted and the extract may be digested with added water only, the treatment after the initial digestion being consistent with the first described embodiment of the process. As in the case of the first described embodiment, the ratio of water to phenol in the second digestion mixture is preferably lower than in the first. If the extract is an "A" extract, it is desirable, consistent with the preferred embodiment of the process, to adjust the composition of the mixture first to be digested so that it contains about 10% water on a hydrocarbon-free basis and so that the combined volume of water and phenol about equals the volume of hydrocarbon present. Such adjustment in a few cases may be substantially accomplished by addition of water: in other cases, by the simple addition of water and phenol. More often, however, it is necessary to remove a portion of the phenol, as by distillation, and to thereafter add water since the extraction of petroleum oils containing lubricating oil components with phenolic solvents to yield raffinates of high viscosity index is generally carried out with an excess of solvent. After the adjustment in the composition of the mixture, the procedure is the same as in the instance of the preferred embodiment of the process as preferably applied to the treatment of "A" extracts, the second digestion being carried out using about 300% by volume (on the raffinate) of aqueous phenol containing about 95% phenol and about 5% water.

The digestion or extraction operations involved in the present invention are most suitably carried out under sufficient agitation to insure adequate contact of the materials. While the operating temperature is subject to considerable variation it is most preferably maintained within the range of from about 130° F. to 210° F. It has been found that uniformity in the product is promoted by conducting the entire process at a substantially constant temperature. The invention may be executed in any suitable type of apparatus either batchwise or in a continuous or intermittent manner. In batch operation at temperatures within the range stated I have found a kettle provided with a jacket through which hot water is continuously circulated to be quite satisfactory.

Recovery of the product from the extract produced upon re-digestion of the raffinate from the first digestion may be conveniently effected by distillation at atmospheric or sub-atmospheric pressure, the residue of the distillation constituting the product. Steam stripping may be employed to insure substantially complete removal of the solvent. The recovered solvent may be re-used according to the invention if desired.

The product may be subjected to a purification treatment such as a vacuum distillation or a differential solvent extraction with liquefied propane or other low-boiling hydrocarbon, for example, butane, in order to lighten the color. This renders the product suitable for purposes for which it might otherwise be considered unsatisfactory. In a vacuum distillation of the product, the same may be collected as a plurality of overhead distillates of somewhat different characteristics.

The practice of the invention is further illustrated by the following examples in which all parts and percentages are by volume. The examples are not to be considered as in any way limiting the scope of the invention.

Example I

The extract processed in this instance was obtained by the solvent extraction of propane de-asphalted Mid-Continent residuum.

The extract was freed of solvent by distillation and steam stripping and thereafter charged to a hot water-jacketed kettle together with an approximately equal amount of aqueous phenol. The solvent contained about 10% of water and 90% phenol. After digestion at a temperature of about 140° F., the mixture was permitted to settle and stratify. The lower extract layer was discarded and the upper or raffinate layer subjected to a further digestion with an aqueous phenol solvent containing about 5% water and 95% phenol, the ratio of solvent to raffinate being 3:1. The upper or raffinate layer from this digestion was discarded and the extract layer distilled and steam stripped to remove solvent, yielding a material, designated product "A," useful as a drying oil and also exhibiting some properties of a solution of resins in a drying oil. The material in color was dark brown with a green cast. The Hanus iodine number was 64.7 and it had an A. P. I. gravity of 7.6.

Example II

The extract subjected to treatment was obtained by the solvent extraction of a de-waxed distillate oil. The extract was rendered solvent-free by a distillation with steam.

A mixture consisting of approximately 1 part of the solvent-free extract and 3 parts of aqueous phenol was charged to the jacketed kettle of Example I and heated to about 190° F. with enough mixing to insure good contact of all materials. The aqueous phenol solvent contained about 22% water and 78% phenol. Following the digestion, the mixture was cooled to about 130° F. and permitted to stand without agitation until two-layer separation occurred. The upper or raffinate layer was then drawn off and subjected to a further digestion at about 190° F. with aqueous phenol. The solvent in this instance contained slightly less than 8% of water, while the ratio of solvent to raffinate was about 2:1. Subsequent to the heating and mixing period, the digested mixture, as in the case of the first digestion, was allowed to stand until stratification into two layers occurred. Distillation and steam stripping of solvent from the lower or extract layer following its separation yielded 34.3% (based on the original extract) of a film forming material having an A. P. I. gravity of 7.6 and a drying time of about 16 hours which compared favorably with the drying time of product "A." Like product "A," the material had an A. P. I. gravity of 7.6 and was dark brown in color. The iodine number was 77.

Example III

An extract representing a substantially anhydrous phenolic solution of non-paraffinic petroleum hydrocarbons derived from a Mid-Continent petroleum oil fraction was thoroughly digested with water at a temperature of about 200° F. with constant mixing. Thereafter the mixture was cooled to 140° F. and left overnight to settle and stratify. The upper or raffinate layer may be further processed according to the procedure previously detailed to give an analogous product. In the case of "A" extracts, the composition of the extract before the initial digestion should be adjusted consistent with Example I.

The film forming materials provided by the invention may be used in coating compositions as substitutes for the relatively more costly vegetable oils such as linseed oil, soybean oil, etc., or they may be employed in conjunction with such oils. In either case, desirable economies may be effected. From the standpoint of rust inhibition, the materials provided by the invention are greatly superior to the vegetable drying oils.

My products can be successfully employed in a wide variety of coatings including primers, floor enamels, drum enamels, and outside paints. In addition, they may be found useful as fabric coatings or impregnants, in flooring compositions, and in plastic compositions generally. They may also be found valuable as intermediates in chemical synthesis.

I claim:

1. A process for producing a film-forming material from a mixture of predominately non-paraffinic hydrocarbons derived from the solvent processing, with an aqueous phenol solvent, of a petroleum oil to increase the concentration of paraffinic constituents therein which comprises subjecting the said hydrocarbons to a digestion with water and a phenol, separating the extract and raffinate phases developing upon settling of the digested mixture, subjecting the raffinate to a further digestion with water and a phenol, and recovering the product of the process from the lower of the two layers developing upon settling of the last digested mixture.

2. A process for obtaining a film-forming material from an extract derived from the solvent treatment of a petroleum oil to remove non-paraffinic constituents therefrom which comprises: freeing the extract of the solvent used in the solvent treatment of the oil, digesting the solvent-free extract with an aqueous phenol solvent, separating the extract and raffinate phases developing upon settling of the digested mixture, subjecting the raffinate to a further digestion with an aqueous phenol solvent, separating the extract and raffinate phases developing upon settling of the digested mixture, and recovering the product of the process from the last mentioned extract.

3. A process for obtaining a film forming material from an extract derived from the solvent treatment of a petroleum oil containing lubricating oil constituents to remove non-paraffinic constituents therefrom which comprises: freeing the extract of the solvent used in the solvent treatment of the oil, digesting the solvent-free extract with an aqueous phenol solvent, separating the extract and raffinate phases developing upon settling of the digested mixture, subjecting the raffinate to a further digestion with an aqueous phenol solvent containing a lower ratio of water than the aqueous phenol solvent employed in the first digestion, separating the extract and raffinate phases developing upon settling of the digested mixture, and recovering the product of the process from the last mentioned extract.

4. A process for obtaining a film forming material from an extract derived from the solvent treatment of a wax-containing oil to remove non-paraffinic constituents therefrom which comprises: freeing the extract of the solvent used in the solvent treatment of the oil, digesting the solvent-free extract at a temperature between 130° F. and 210° F. with approximately an equal amount by volume of an aqueous phenol solvent containing about 90% by volume of the phenol and about 10% by volume of water, separating the extract and raffinate phases developing upon settling of the digested mixture, subjecting the separated raffinate at a temperature between 130° F. and 210° F. to a further digestion with an aqueous phenol solvent containing about 95% by volume of the phenol and about 5% by volume of water, the ratio of aqueous phenol solvent to raffinate being of the order of 3:1, separating the extract and raffinate phases developing upon settling of the digested mixture, and distilling and steam stripping the last mentioned extract to produce a residue constituting the product of the process.

5. A process for obtaining a film-forming material from a phenolic solution of predominately non-paraffinic hydrocarbons obtained by the extraction with a phenolic solvent of a petroleum oil containing paraffinic and non-paraffinic components, which comprises: digesting the solution with water, allowing the digested mixture to settle until two layer separation occurs, subjecting the upper or raffinate layer to further digestion with an aqueous phenol solvent, separating the extract and raffinate phases developing upon settling of the digested mixture, and recovering the product of the process from the extract.

6. A process for obtaining a film-forming material from a phenolic solution of predominately non-paraffinic hydrocarbons obtained by the extraction with a phenolic solvent of a petroleum oil containing paraffinic and non-paraffinic components which comprises: digesting the solution with water, allowing the digested mixture to settle until two layer separation occurs, subjecting the upper of said layers to a further digestion with an aqueous phenol solvent, the ratio of water to phenol in this second digestion mixture being lower than the ratio of water to phenol in the first digestion mixture, separating the extract and raffinate phases developing upon settling of the digested mixture, and recovering the product of the process from the last mentioned extract.

7. A process for obtaining a film forming material from a phenolic solution of predominantly non-paraffinic hydrocarbons obtained by the extraction of a wax-containing petroleum oil with a phenolic solvent which comprises: adjusting the composition of the solution so that it contains about 10% by volume of water on a hydrocarbon-free basis and so that the combined volume of the phenol and water about equals the volume of hydrocarbon present in the solution, subjecting the now aqueous or more aqueous mixture while under agitation to heat at a temperature between 130° F. and 210° F., separating the two layers developing upon settling of the mixture, digesting the upper or raffinate layer at a temperature between 130° F. and 210° F. with about 300% by volume of an aqueous phenol solvent containing about 95% by volume of the phenol and about 5% by volume of water, separating the extract and raffinate phases developing upon settling of the digested mixture, and distilling and steam stripping the extract to produce a residue constituting the product of the process.

JOSEPH J. O'NEILL.